United States Patent
Meyer (10) Patent No.: US 9,824,169 B2
(45) Date of Patent: *Nov. 21, 2017

(54) REGRESSION SIGNATURE FOR STATISTICAL FUNCTIONAL COVERAGE

(71) Applicant: Mentor Graphics Corporation, Wilsonville, OR (US)

(72) Inventor: Andreas Meyer, Newburyport, MA (US)

(73) Assignee: Mentor Graphics Corporation, Wilsonville, OR (US)

( * ) Notice: Subject to any disclaimer, the term of this patent is extended or adjusted under 35 U.S.C. 154(b) by 575 days.

This patent is subject to a terminal disclaimer.

(21) Appl. No.: 14/168,884

(22) Filed: Jan. 30, 2014

(65) Prior Publication Data

US 2015/0213174 A1    Jul. 30, 2015

(51) Int. Cl.
*G06F 17/50* (2006.01)
*G01R 31/3183* (2006.01)

(52) U.S. Cl.
CPC ... *G06F 17/5022* (2013.01); *G01R 31/31835* (2013.01); *G06F 2217/10* (2013.01)

(58) Field of Classification Search
CPC ............ G06F 17/5009; G06F 17/5022; G06F 17/5027; G06F 17/5036; G06F 17/5045; G01R 31/31835; G01R 31/318342; G01R 31/318357; G01R 31/318364

USPC ................. 716/100, 106–107, 136
See application file for complete search history.

(56) References Cited

U.S. PATENT DOCUMENTS

| | | | |
|---|---|---|---|
| 2002/0002698 A1 | 1/2002 | Hekmatpour | |
| 2003/0225565 A1* | 12/2003 | Garcia | G06F 17/5022 703/23 |
| 2003/0229864 A1* | 12/2003 | Watkins | G06F 17/5022 716/106 |
| 2004/0163059 A1* | 8/2004 | Subbarayan | G06F 17/5009 716/106 |
| 2005/0283664 A1* | 12/2005 | Coulter, Jr. | G06F 11/261 714/15 |
| 2006/0053357 A1* | 3/2006 | Rajski | G01R 31/01 714/742 |

* cited by examiner

*Primary Examiner* — Paul Dinh
(74) *Attorney, Agent, or Firm* — Mentor Graphics Corporation (57) ABSTRACT

This application discloses a computing system to implement a design verification tool and simulate a circuit design with a regression. The computing system can capture events performed by a circuit design simulated with a regression and identify that one or more combinations of the captured events covers system level functionality of the circuit design. The computing system can determine whether the system level functionality covered by the combinations of the captured events was previously uncovered for the circuit design, and generate a regression efficiency metric configured to quantify newly covered system level functionality prompted by the regression.

15 Claims, 10 Drawing Sheets

REGRESSION SIGNATURE FOR STATISTICAL FUNCTIONAL COVERAGE

RELATED APPLICATIONS

This patent application is related to U.S. patent application Ser. No. 14/168,817, filed Jan. 30, 2014.

TECHNICAL FIELD

This application is generally related to electronic design automation and, more specifically, to a regression signature for statistical functional coverage.

BACKGROUND

Microdevices, such as integrated microcircuits and microelectromechanical systems (MEMS), are used in a variety of products, from automobiles to microwaves to personal computers. Designing and fabricating microdevices typically involves many steps, known as a "design flow." The particular steps of a design flow often are dependent upon the type of microcircuit, its complexity, the design team, and the microdevice fabricator or foundry that will manufacture the microcircuit. Typically, software and hardware "tools" verify the design at various stages of the design flow by running software simulators and/or hardware emulators, and errors in the design are corrected or the design is otherwise improved.

Several steps are common to most design flows for integrated microcircuits. Initially, the specification for a new circuit is transformed into a logical design, sometimes referred to as a register transfer level (RTL) description of the circuit. With this logical design, the circuit can be described in terms of both the exchange of signals between hardware registers and the logical operations that can be performed on those signals. The logical design typically employs a Hardware Design Language (HDL), such as the Very high speed integrated circuit Hardware Design Language (VHDL). As part of the creation of a logical design, a designer will also implement a place-and-route process to determine the placement of the various portions of the circuit, along with an initial routing of interconnections between those portions. The logic of the circuit is then analyzed, to confirm that it will accurately perform the functions desired for the circuit. This analysis is sometimes referred to as "functional verification."

The "functional verification" begins with a circuit design coded at a register transfer level (RTL) being simulated by a design verification tool. A designer, for example, utilizing the design verification tool, can generate a test bench that can allow the design verification tool to analyze or verify the functionality of the simulated circuit design. Since it is often impractical to perform functional verification utilizing test benches that cover every possible operation for the simulated circuit design, many designers develop test benches that provide just a subset of possible input vectors to the simulated circuit design.

The design verification tool can attempt to identify how well those test benches came to covering or adequately exercising the simulated circuit design. Conventional techniques to determine test bench coverage of the circuit design include code coverage and functional coverage. Code coverage, such as statement coverage, decision coverage, condition coverage, expression coverage, or the like, can identify which lines, statements, expressions, decisions, in the code of the circuit design were exercised by the test bench during simulation. Functional coverage can quantify how well a test bench came to covering or adequately exercising functionality in the simulated circuit design. For example, a circuit design having a cache system can be deemed fully covered by conventional coverage techniques when each cache in the cache system enters every "legal" operational state in response to every "legal" event or transaction.

SUMMARY

This application discloses tools and mechanisms for determining a regression signature for statistical functional coverage in a circuit design. According to various embodiments, the tools and mechanisms can capture events performed by a circuit design simulated with a regression and identify that one or more combinations of the captured events covers system level functionality of the circuit design. The tools and mechanisms can determine whether the system level functionality covered by the combinations of the captured events was previously uncovered for the circuit design, and generate a regression efficiency metric configured to quantify newly covered system level functionality prompted by the regression.

DETAILED DESCRIPTION

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads.

Figure 1:
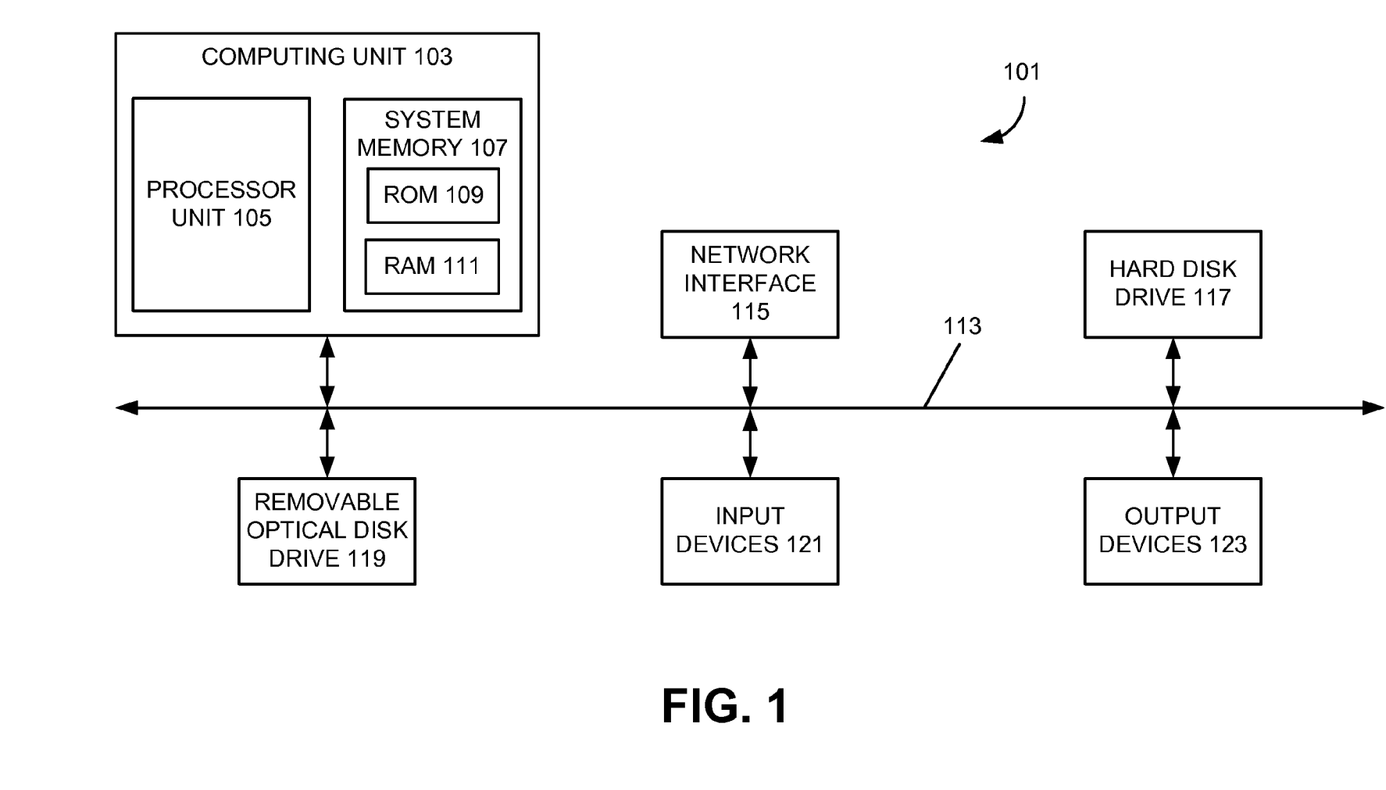
FIGS. 1 and 2 illustrate an example of a computer system of the type that may be used to implement various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
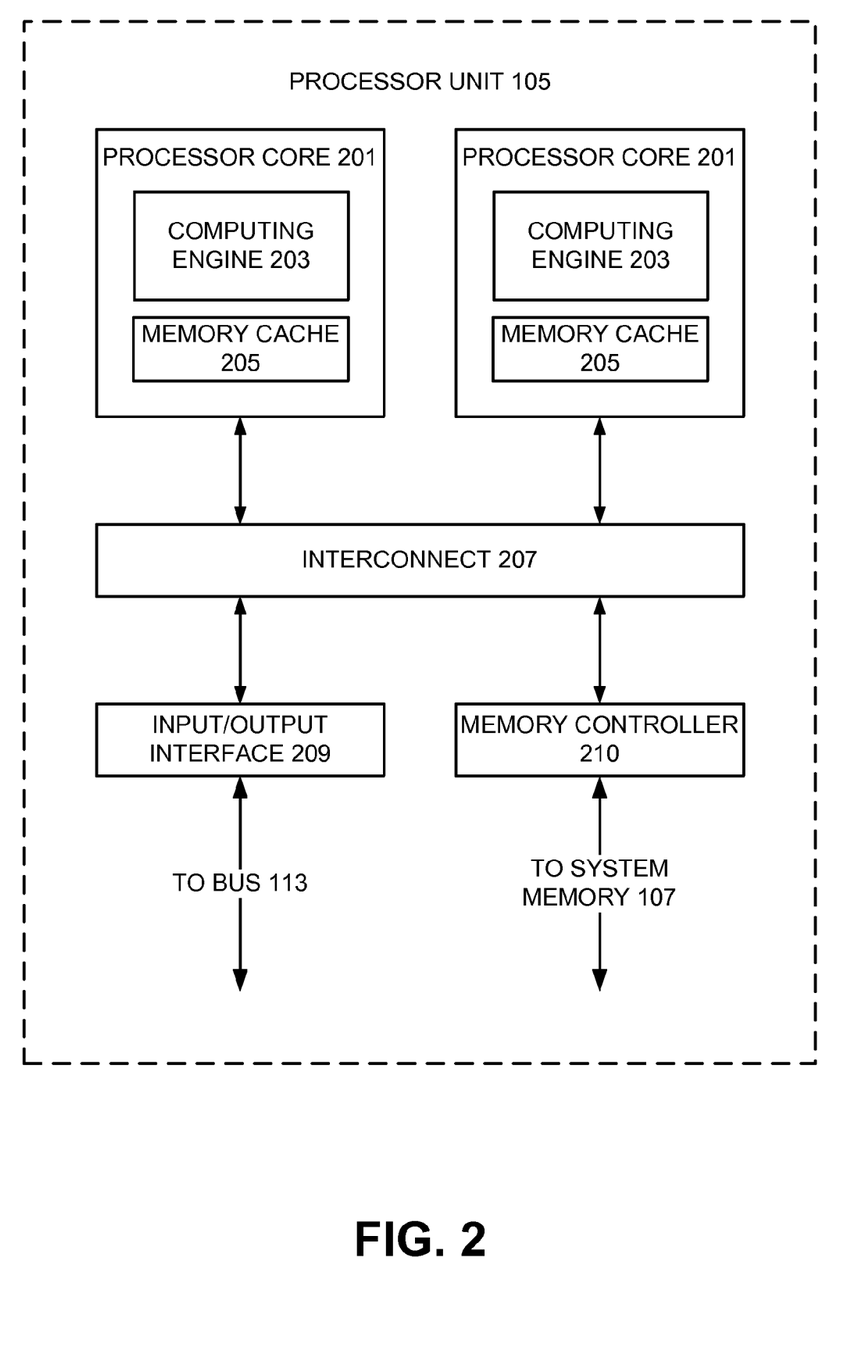

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 113. Similarly, the memory controller 211 controls the exchange of information between the processor unit 201 and the system memory 107. With some implementations of the invention, the processor units 201 may include additional components, such as a high-level cache memory accessible shared by the processor cores 201.

It also should be appreciated that the description of the computer network illustrated in FIG. 1 and FIG. 2 is provided as an example only, and it not intended to suggest any limitation as to the scope of use or functionality of alternate embodiments of the invention.

Design Verification Tool with System Level Regression Analysis

Figure 3:
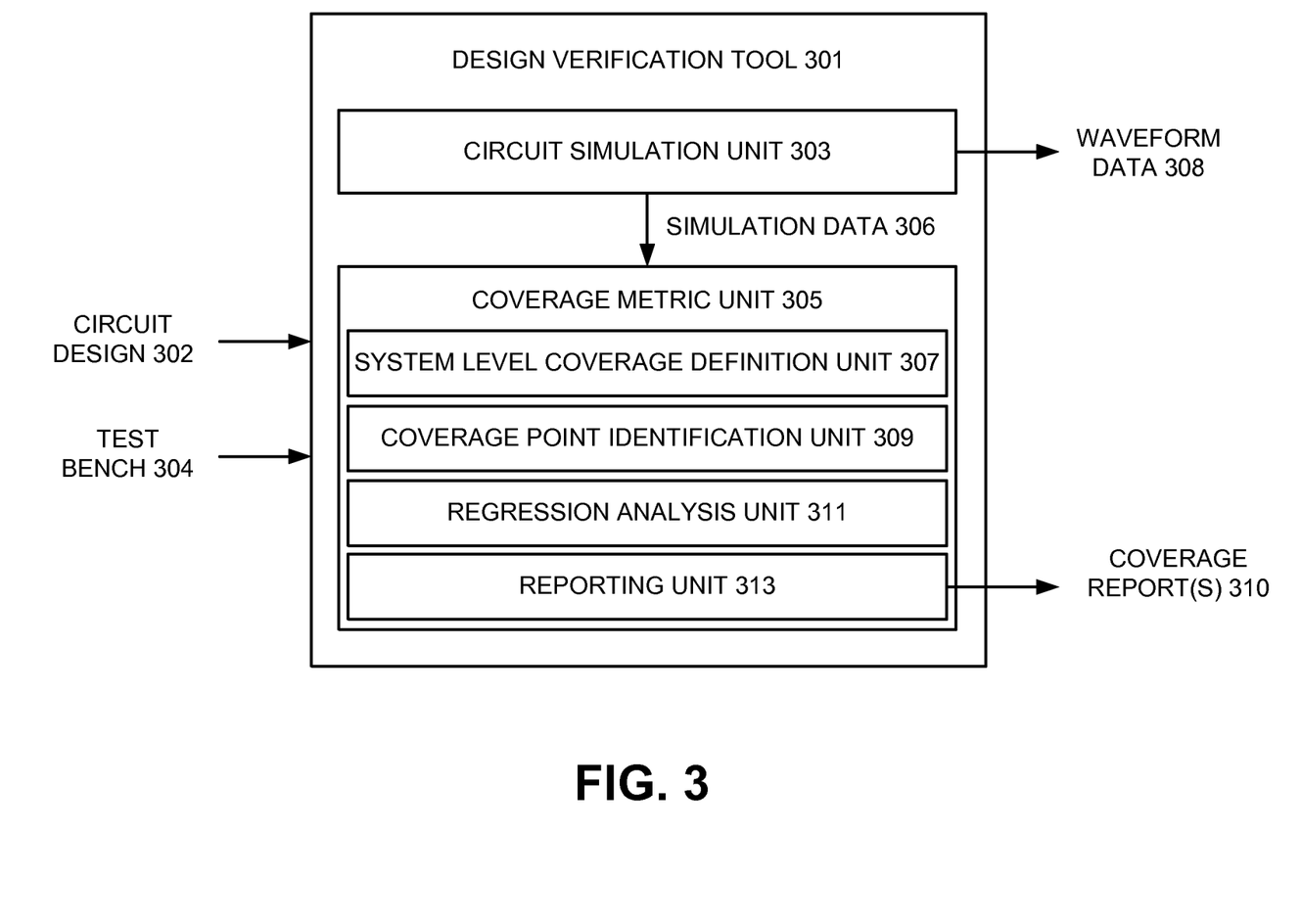
FIG. 3 illustrates an example of a design verification tool capable of performing regression analysis to determine system level coverage of one or more regressions that may be implemented according to various embodiments of the invention.

FIG. 3 illustrates an example of a design verification tool 301 capable of performing regression analysis to determine system level coverage of one or more regressions that may be implemented according to various embodiments of the invention. Referring to FIG. 3, the design verification tool 301 can receive a circuit design 302, which can describe an electronic device both in terms of an exchange of data signals between components in the electronic device, such as hardware registers, flip-flops, combinational logic, or the like, and in terms of logical operations that can be performed on the data signals in the electronic device. The circuit design 302 can model the electronic device at a register transfer level (RTL), for example, with code in a hardware description language (HDL), such as Verilog, Very high speed integrated circuit Hardware Design Language (VHDL), or the like. In some embodiments, the design verification tool 301 can receive the circuit design 302 from a source external to the design verification tool 301, such as a user interface of the computing device 101, another tool implemented by the computing device 101, or the design verification tool 301 may internally generate the circuit design 302.

The design verification tool 301 can receive a test bench 304 that, during simulation, can implement one or more regressions for the circuit design 302. For example, the test bench 304 can generate one or more sets of test stimuli implementing test scenarios capable of being utilized to determine whether the circuit design 302 functions as expected. In some embodiments, the design verification tool 301 can receive the test bench 304 from a source external to the design verification tool 301, such as a user interface of the computing device 101, another tool implemented by the computing device 101, or the design verification tool 301 may internally generate the test bench 304.

The design verification tool 301 can include a circuit simulation unit 303 to simulate the circuit design 302 based, at least in part, on the test bench 304. The circuit simulation unit 303 can generate waveform data 308, which can correspond to a simulated output created by the circuit design 302 during simulation with the test bench 304. The design verification tool 301 (or a tool external to the design verification tool 301) can perform functional verification for the circuit design 302, for example, by comparing the waveform data 308 with an expected output from the circuit design 302 in response to test stimuli generated by the test bench 304 during simulation.

The design verification tool 301 can include a coverage metric unit 305 to collect simulation data 306, for example, by monitoring the circuit design 302 during simulation, receiving the simulation data 306 from a results database, or the like. In some embodiments, the simulation data 306 can include information corresponding to data signals or data transactions communicated in the circuit design 302 during simulation, a timing of the data signal or data transaction communication, an identification of the components in the circuit design 302 transmitting and receiving the data signals, the various operational states of those components, or the like. Although FIG. 3 shows the coverage metric unit 305 as separate from the circuit simulation unit 303, in some embodiments, the coverage metric unit 305 may be included in the circuit simulation unit 303.

Figure 4:
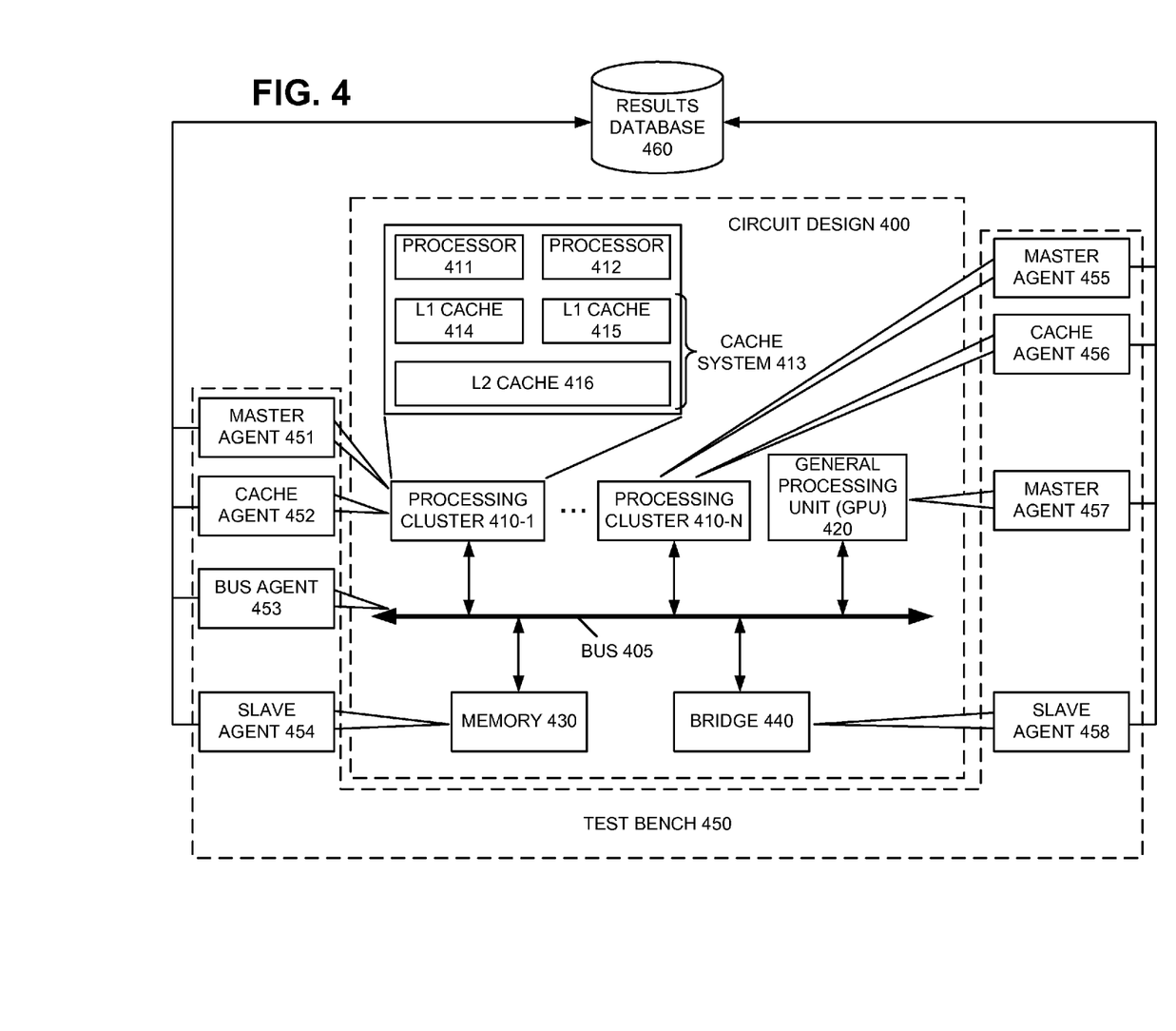
FIG. 4 illustrates an example implementation of simulation data capture in a circuit design according to various embodiments of the invention.

FIG. 4 illustrates an example implementation of simulation data capture in a circuit design 400 according to various embodiments of the invention. Referring to FIG. 4, the circuit design 400 can include multiple master components, such as processing clusters 410-1 to 410-N, general processing unit (GPU) 420, or the like, and multiple slave components, such as memory 430, bridge 440, or the like, to communicate with each other over a bus 405.

The processing clusters 410-1 to 410-N can each include multiple processors and a cache system to store data, for example, from the memory 430, for utilization by the processors. For example, the processing cluster 410-1 can include processors 411 and 412, and a cache system 413 having level-1 (L1) caches 414 and 415 and a level-2 (L2) cache 416 available to store data for use by the processors 411 and 412. The processing clusters 410-1 to 410-N can implement a cache coherency protocol, such as MSI, MESI, MOESI, MERSI, MESIF, write-once, or the like, to ensure consistency of data stored in the different caches from a common physical address of a shared resource, such as the memory 430.

During simulation of the circuit design 400, a test bench 450 can provide input vectors to the circuit design 400, which can prompt the circuit design 400 to perform various operations. The test bench 450 can include various monitoring modules to monitor data transactions or other events in the circuit design 400 that were prompted by the input vectors from the test bench 450 and to record them in a results database 460. The monitoring modules can include master agents 451, 455, and 457 to monitor master devices, such as the processing clusters 410-1 to 410-N and the GPU 420, include cache agents 452 and 456 to monitor or mirror the cache systems in the processing clusters 410-1 to 410-N, respectively, include a bus agent 453 to monitor the bus 405, and include slave agents 454 and 458 to monitor slave devices, such as the memory 430 and the bridge 440. Each of the monitoring modules can record monitored information or simulation data, such as data transactions, events, interrupts, cache operational states, or the like, to a results database 460. In some embodiments, a design verification tool, such as the design verification tool 301 shown FIG. 3, can access the results database 460 to analyze and possibly correlate information stored therein to perform system level coverage and regression analysis.

Referring back to FIG. 3, the coverage metric unit 305 can utilize the simulation data 306, for example, stored in the results database 460 shown in FIG. 4, to determine how the test bench 304 exercised the circuit design 302 during simulation. For example, the coverage metric unit 305 can analyze the simulation data 306 to identify metrics for code coverage and function coverage, as well as perform higher-level analysis to generate metrics and/or plots for system level coverage and regression signatures.

The coverage metric unit 305 can include a system level coverage definition unit 307 to define system level functionality of the circuit design 302 that is capable of being covered during simulation by the test bench 304. The system level functionality can be defined as multiple different system level coverage points, for example, each comprising a combination of multiple events in simulation data 306, such as specific transactions, component states, or the like, occurring within a specific window of time relative to each other. In some embodiments, the definition of each system level coverage point also can include an identification of components in the circuit design 302 corresponding to the multiple events and when the multiple events occurred within the window of time relative to each other. Since each circuit design 302 can have an individualized architecture, these definitions of system level coverage points can vary from circuit design-to-circuit design.

The system level coverage definition unit 307 can classify the system level coverage points in various ways. For example, the system level coverage definition unit 307 can classify system level coverage points by a type of system level functionality. In some embodiments, the system level coverage definition unit 307 also can classify system level coverage points by corresponding to the multiple events and when the multiple events occurred within the window of time. For example, when the system level coverage definition unit 307 defines system level functionality type as overlapping access by different components to a common physical address of a shared memory resource, the system level coverage definition unit 307 can classify the system level coverage points by their type as well as the combinations of components that can have overlapping access to the shared memory resource and/or the relative timing of the accesses to the physical address.

The system level coverage definition unit 307 can generate the definitions of the system level coverage points in various ways. For example, the system level coverage definition unit 307 can receive user input (not shown) that indicates the parameters or characteristics of one or more system level coverage points. In some embodiments, the system level coverage definition unit 307 can automatically review or analyze the circuit design 302, for example, against a library of system level architecture patterns, previously-defined system level coverage points for other circuit designs, or the like, to identify system level coverage points for the circuit design 302. The system level coverage definition unit 307, in some embodiments, can prompt presentation of the automatically-identified system level coverage points for review and/or approval by a user. The system level coverage definition unit 307 also can define system level coverage points dynamically, for example, by reviewing the simulation data 306 to determine when two or more components functionally-interrelate during simulation and/or a relative timing between operations of the two or more components renders them functionally-interrelated.

The system level coverage definition unit 307, in some embodiments, can generate at least one matrix of the potential system level coverage points capable of being hit or covered by a regression implemented by the test bench 304 during simulation of the circuit design 302. The matrix can be arranged to group similar system level coverage points near each other. For example, system level coverage points corresponding to a common system level functionality type, common component interaction, common transaction or state transition timing, or the like, can be located near each other in the matrix.

The coverage metric unit 305 can include a coverage point identification unit 309 to analyze transactions, component states, or other events in the simulation data 306 and determine when combinations of the transactions, component states, or other events correspond to at least one of the system level coverage points. The coverage point identification unit 309 can record occurrences of the system level coverage points and the individual transactions, components states, events, or the like, that prompted the identification of the corresponding system level coverage points. In some embodiments, the coverage point identification unit 309 can populate the matrix of potential system level coverage points with indications of which of the potential system level coverage points where hit during simulation. By analyzing the data transactions or other events in the simulation data 306, the coverage point identification unit 309 can determine whether the test bench 304 provides stimulus to cover functionality of higher-level systems and sub-systems in the circuit design 302 whose state or operation can be dependent upon data with the transactions or other events in the simulation data 306. Embodiments of system level coverage will be described below in greater detail.

The coverage metric unit 305 can include a regression analysis unit 311 to analyze the system level coverage points identified by the coverage point identification unit 309 and to generate at least one metric or plot to indicate how well the test bench 304 or a portion thereof performed in covering the system level functionality defined by the system level coverage definition unit 307. For example, the regression analysis unit 311 can generate a metric to identify a percentage of the system level coverage points hit by the test bench 304. This overall percentage metric can provide a broad understanding of whether the test bench 304 or regression implemented by the test bench 304 provided stimulus that exercised the system level functionality of the circuit design 302. The regression analysis unit 311 also can generate one or more plots to graphically illustrate the overall percentage metric.

The regression analysis unit 311 can generate a regression signature metric to identify a percentage of new system level coverage points hit during simulation, for example, by a new regression or sub-regression. The regression signature metric can indicate an overlap in system level coverage by a regression compared to previous regressions run by the test bench 304 during simulation of the circuit design 302. In some embodiments, a magnitude of the regression signature metric can indicate a magnitude of the percentage of the system level coverage points hit by a new regression that were un-hit by any previous regression. The regression analysis unit 311 also can generate one or more plots to graphically illustrate the regression signature metric.

The regression analysis unit 311 can generate a regression efficiency metric to identify how efficient a new regression or sub-regression was at identifying new system level coverage. In some embodiments, the regression analysis unit 311 can divide the coverage metric by an effort of the new regression or sub-regression to identify the regression efficiency metric. The effort of the new regression or sub-regression can correspond to a number of cycles simulated for the new regression or sub-regression, a simulation time for the new regression or sub-regression, or the like. The regression analysis unit 311 also can generate one or more plots to graphically illustrate the regression efficiency metric.

The regression analysis unit 311 can generate a metric to identify a distribution of system level coverage point hits. This regression distribution metric can indicate how well a regression has been distributed across the different types of system level coverage points, for example, a spread of coverage point hits across different system level functionality types, across space, such as different components performing the system level functionality, and/or across time, such as the timing of the transactions or state changes corresponding to the system level functionality. In some embodiments, the regression analysis unit 311 can analyze the matrix as populated with the system level coverage point hits to ascertain the distribution of the system level coverage point hits. For example, the regression analysis unit 311 can utilize a nearest neighbor analysis on the matrix to measure distances between points in the matrix corresponding to system level coverage point hits. The regression analysis unit 311 can utilize these distances between system level coverage point hits, to generate the regression distribution metric. The regression analysis unit 311 also can generate one or more plots to graphically illustrate the regression distribution metric.

The regression analysis unit 311 also can analyze the matrix as populated with the system level coverage point hits to identify any holes in the matrix without (or with few) system level coverage point hits. In some embodiments, the regression analysis unit 311 can utilize the distances between system level coverage point hits measured in the nearest neighbor analysis to identify the holes in the system level coverage. For example, the larger the distance between system level coverage point hits, the higher the probability that the matrix includes a hole that lacks system level coverage point hits. When the regression analysis unit 311 identifies a hole or potential hole in the matrix, the regression analysis unit 311 can generate a metric or plot to highlight the hole to a user. For example, when the hole corresponds to a lack of system level coverage point hits in a type of system level functionality, the regression analysis unit 311 can generate a plot to illustrate the system level coverage points hit and un-hit in that type of system level functionality.

The coverage metric unit 305 can include a reporting unit 313 to generate one or more coverage reports 310 to indicate system level coverage by at least a portion of a regression implemented by the test bench 304. For example, the coverage reports 310 can include one or more of the metrics generated by the regression analysis unit 311, which can indicate how the test bench 304 exercised system level functionality of the circuit design 302 during simulation. The coverage reports 310 also can include code coverage and functional coverage metrics to convey how well the test bench 304 came to covering individual components and/or lower-level functionality in the circuit design 302. The reporting unit 313 also can prompt presentation of plots generated by the regression analysis unit 311 in a display window. In some embodiments, the plot can be a table or graphical display populated with simulation data 306 corresponding to system level coverage points hit during simulation.

Figure 5:
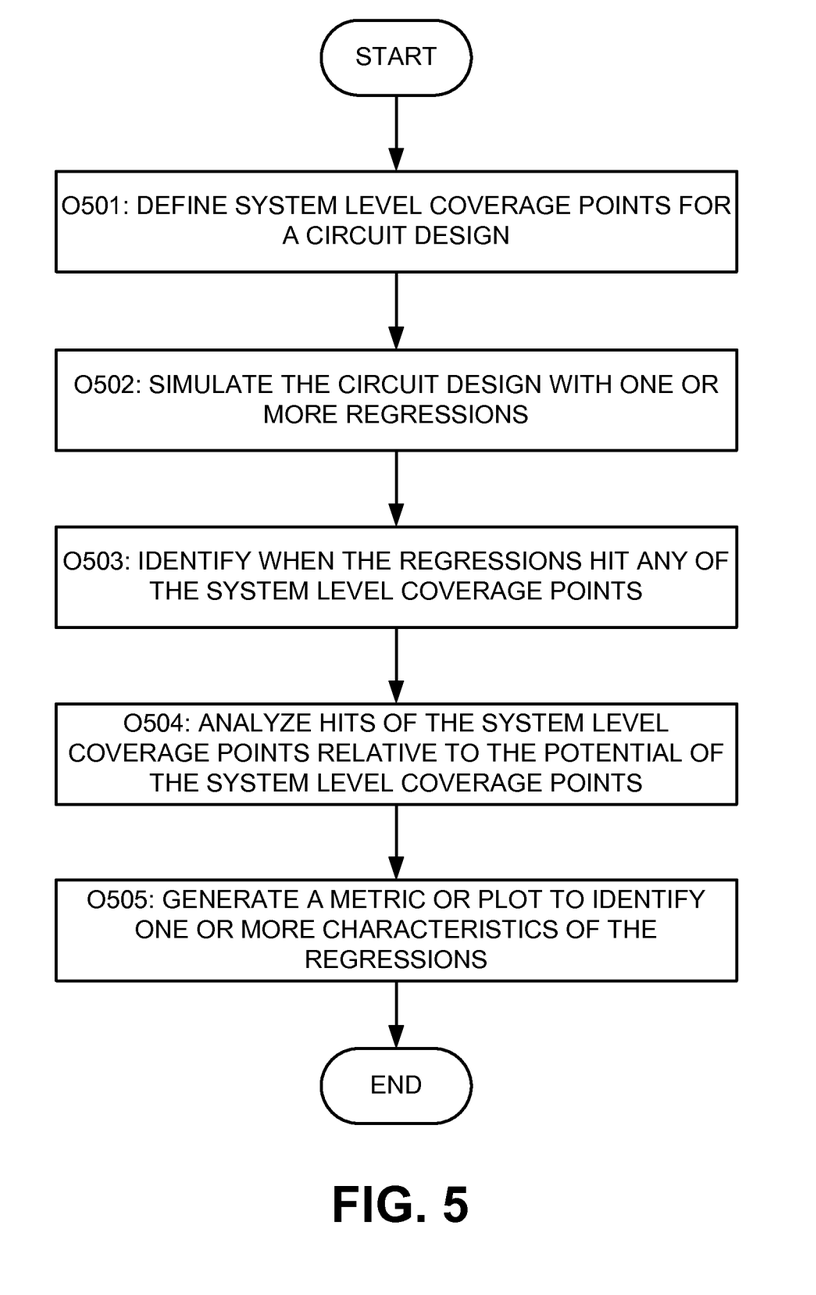
FIG. 5 illustrates a flowchart showing an example implementation of system level coverage according to various examples of the invention.

FIG. 5 illustrates a flowchart showing an example implementation of system level coverage according to various examples of the invention. Referring to FIG. 5, in a block 501, a design verification tool can define system level coverage points for a circuit design that are capable of being covered by one or more regressions during simulation of the circuit design. The system level coverage points can each be defined as a combination of multiple events in simulation data, such as specific transactions, component states, or the like, occurring within a specific window of time. In some embodiments, the definition of each system level coverage point also can include an identification of components in the circuit design corresponding to the multiple events and when the multiple events occurred within the window of time. Since each circuit design can have an individualized architecture, these definitions of system level coverage points can vary from circuit design-to-circuit design.

In a block 502, the design verification tool can simulate a circuit design with a test bench implementing one or more regression. During simulation, the test bench implementing the regressions, which can provide a set of test stimuli to the simulated circuit design, prompting the circuit design to perform operations, state changes, or the like, and output waveform data. The design verification tool can capture, during simulation of the circuit design, simulation data for components in the circuit design. In some embodiments, the simulation data can include operational states of the components in the circuit design, data transactions prompting transitions between the operational states for the components, or the like.

In a block 503, the design verification tool can identify when simulation data generated in response to the regressions hit any of the system level coverage points. In some embodiments, the design verification tool can review or analyze the simulation data to determine when a combination of transactions or states in the simulation data correspond to at least one of the defined system level coverage points.

In a block 504, the design verification tool can analyze the hits of system level coverage points relative to potential system level coverage points, for example, to determine how well the regressions exercised system level functionality. The design verification tool can perform this analysis without specific context, for example, identifying a raw number of system level coverage points that were hit, or perform this analysis with one or more layers of context, for example, comparing the system level coverage points hits to previously hit or un-hit system level coverage points. The design verification tool also can determine a distribution of the hits of system level coverage points In a block 505, the design verification tool can generate a metric or plot to indicate one or more characteristics of the regressions, for example, to indicate how well the regressions performed in covering the system level coverage points. The design verification tool can generate a metric or plot to identify a percentage of the system level coverage points hit by the test bench. This overall percentage metric can provide a broad understanding of whether the regressions implemented by the test bench provided stimulus that exercises system level functionality of the circuit design.

The design verification tool can generate a statistical coverage metric or plot to identify a percentage of new system level coverage points hit during simulation compared to previously hit system level coverage points. This statistical coverage metric or plot also can indicate an overlap in system level coverage by a regression compared to previous regressions run by the test bench during simulation of the circuit design. In some embodiments, a magnitude of the metric or number of points covered in the plot can indicate a magnitude of the percentage of the system level coverage points hit by the regression that were un-hit by any previous regression. The design verification tool can utilize the metric or plot to identify a regression efficiency metric for the regression, which can identify how efficient the regression was at identifying new system level coverage. In some embodiments, the design verification tool can divide the statistical coverage metric by an effort of the regression to identify the regression efficiency metric. The effort of the regression can correspond to a number of cycles simulated for the new regression or sub-regression, a simulation time for the new regression or sub-regression, or the like.

The design verification tool can generate a metric or plot to identify a distribution of system level coverage point hits, or the like. This regression distribution metric can indicate how well a regression has been distributed across the different types of system level coverage points, for example, a spread of coverage point hits across different system level functionality types, across space, such as different components performing the system level functionality, and/or across time, such as the timing of the transactions or state changes corresponding to the system level functionality.

Figure 6A:
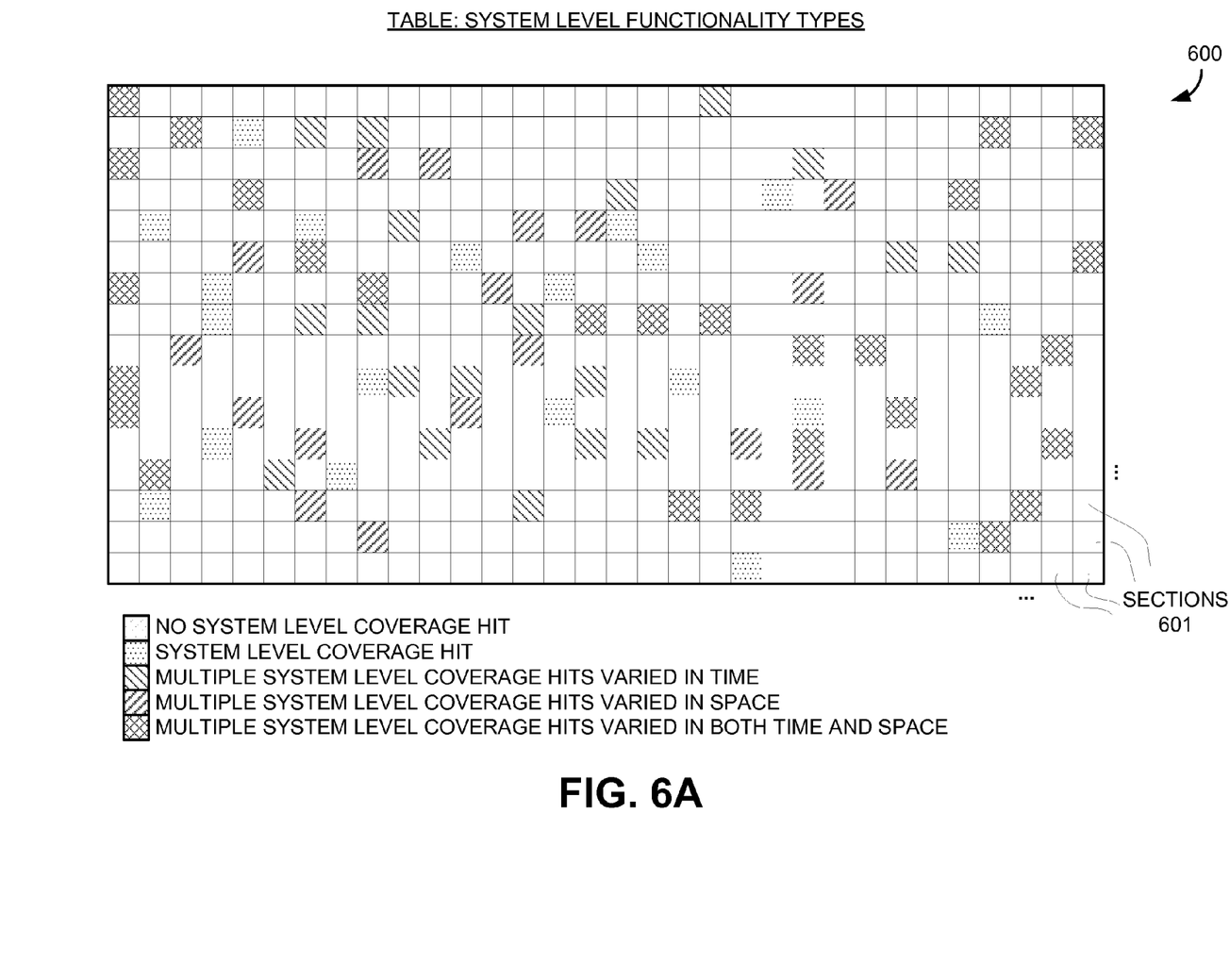
FIGS. 6A-6D illustrate example presentations of system level coverage viewable in a display window according to various embodiments of the invention.

FIGS. 6A-6D illustrate example presentations of system level coverage viewable in a display window according to various embodiments of the invention. Referring to FIG. 6A, a table 600 can illustrate a high-level representation of system level coverage for different types of system level functionality. The table 600 can include multiple sections 601, each of which corresponding to a different type of system level functionality. In some embodiments, the sections 601 can be arranged in the table 600 to group similar system level functionalities together. Although the table 600 is shown in row-column format with each section having a same size and shape, in some embodiments, the table 600 can be configured differently, for example, to accentuate relationships between system level functionalities, to ease review for system level coverage, or the like.

The sections 601 can be modified to indicate whether a system level coverage point hit occurred for the system level functionality corresponding to that section 601. In some embodiments, the sections 601 can be resized, reshaped, shaded, colored, textured, patterned, or the like, to indicate a presence of one or more system level coverage points for the system level functionality corresponding to that section 601. For example, the table 600 shows sections 601 having different patterns depending on a number of system level coverage point hits for a system level functionality and how multiple system level coverage point hits varied across space and/or time. Varying across space can correspond to different sets of components within a circuit design implementing the system level functionality of a section 601, while varying across time can correspond to relative timing difference(s) in a set of transactions or state changes effectuating the system level functionality.

In some embodiments, the sections 601 also can be selectable, for example, in response to user input. The sections 601, when selected, can prompt presentation of different graphic associated with the system level functionality corresponding to the selected section 601. For example, a selection of a section 601 can prompt a display of a graphic populated with possible system level coverage points corresponding to different components or combinations of components that can implement the system level functionality. The selection of a section 601 also can prompt a display of a graphic populated with possible system level coverage points corresponding to different relative timings of the transactions or state changes that implement the system level functionality.

Figure 6B:
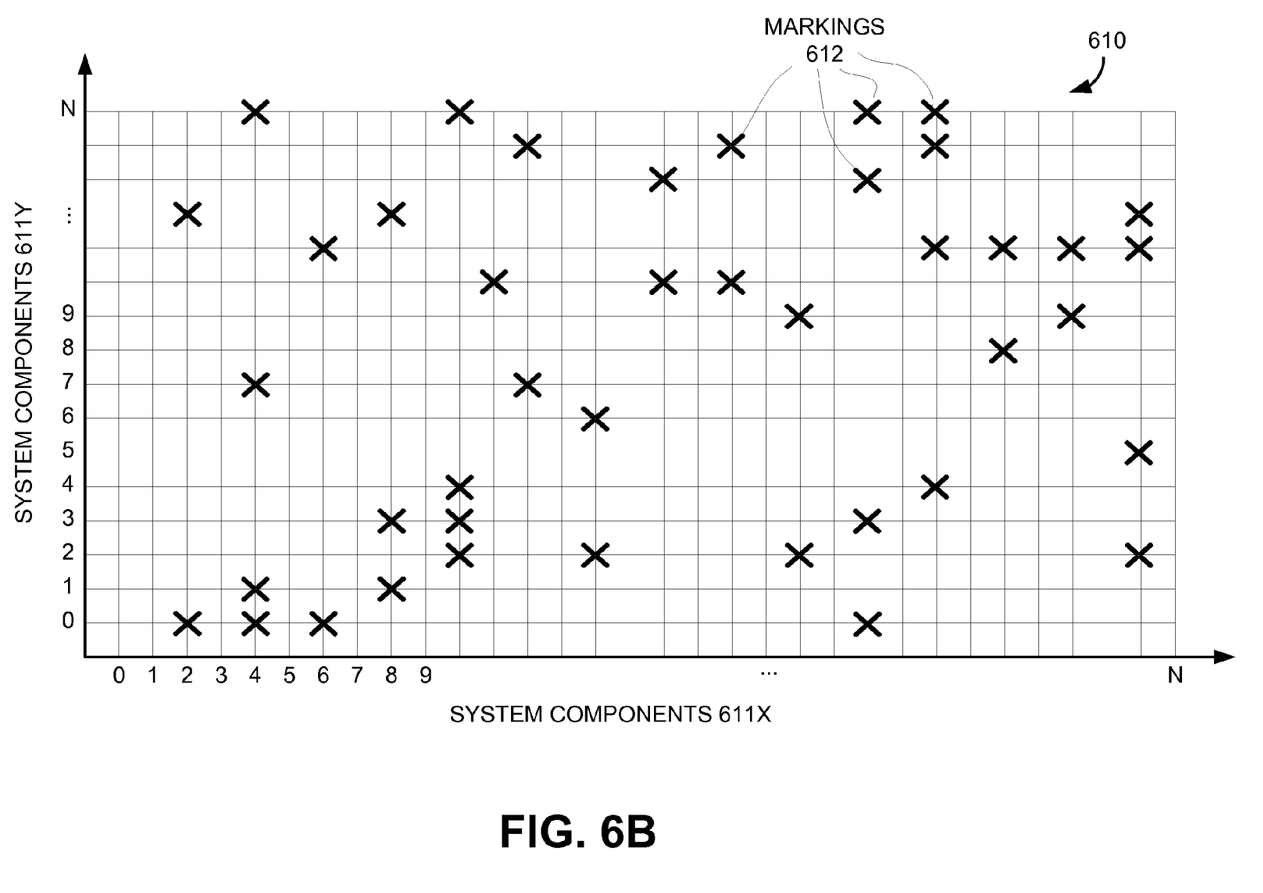

Referring to FIG. 6B, a chart 610 can illustrate a representation of system level coverage varied in space, for example, corresponding to a particular type of system level functionality. The chart 610 can include an x-axis and a y-axis both having a list of system components 611X and 611Y, respectively, in a circuit design capable of implementing at least a portion of the particular type of system level functionality. The intersections of the system components 611X and 611Y on the x-axis and the y-axis, respectively, in the chart 610 can correspond to different system level coverage points, for example, capable of being hit during simulation of the circuit design with a regression.

In some embodiments, these intersections can be marked or modified to indicate whether the system components 611X and 611Y correspond to a system level coverage point hit for the system level functionality represented in the table 610. For example, the intersections can be marked with an "X" to indicate a presence of a system level coverage point. The markings 612 at the intersections can be resized, reshaped, shaded, colored, textured, patterned, or the like, to indicate when multiple system level coverage points for those intersections.

In some embodiments, the markings 612 at the intersections of the chart 610 also can be selectable, for example, in response to user input. The markings 612 at the intersections, when selected, can prompt presentation of different graphic, such as a higher-level of abstraction, lower-level of abstraction, and/or one that presents a different relative timings of the transactions or state changes that implement the system level coverage point. For example, a selection of a marking 612 can prompt a display of a higher-level graphic that shows multiple system level functionality types. The selection of the marking 612 also can prompt a display of a graphic populated with possible system level coverage points corresponding to different relative timings of the transactions or state changes corresponding to the particular combination of system components 611X and 611Y associated with the marking 612.

The chart 610 can arrange the system components 611X and 611Y on the x-axis and y-axis, respectively, to group similar system level coverage points together via the intersections in the chart 610. Although the table 610 is shown in row-column format, in some embodiments, the table 610 can be configured differently, for example, to accentuate relationships between system level functionalities, to ease review for system level coverage, or the like.

Figure 6C:
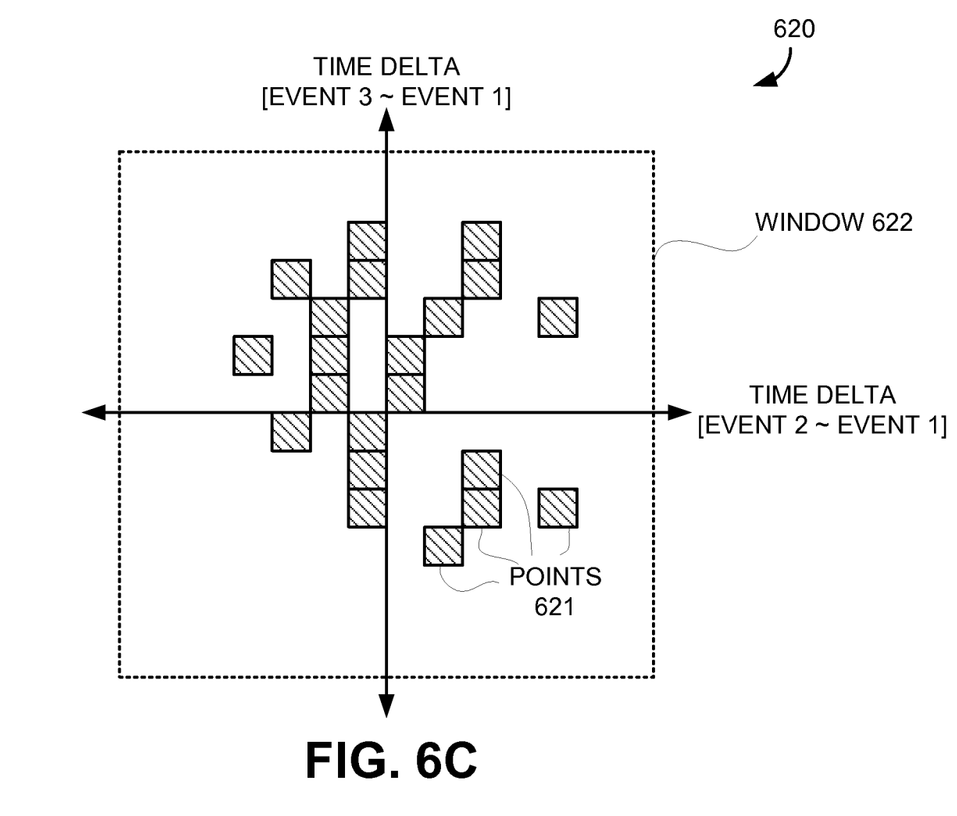

Referring to FIG. 6C, a chart 620 can illustrate timing for multiple events occurring during simulation of a circuit design. In some embodiments, the multiple events can include data transactions or state changes that prompt system level coverage points for a particular set of components in the circuit design and/or for a particular type of system level functionality.

The chart 620 can have an occurrence of a first event situated on a point (0,0) of an x-y plot, such as a system interrupt, data transaction, state change, or the like. The x-y plot can have an x-axis corresponding to a time difference between a second event relative to the first event, and have a y-axis corresponding to a time difference between a third event relative to the first event. In some examples, the second and third events can correspond to data transactions or component state changes that prompt system level coverage points for a particular set of components in the circuit design and/or for a particular type of system level functionality.

The chart 620 can include points 621, each of which can correspond to a relative timing difference between multiple data transactions or state changes prompting at least one system level coverage point. The chart 620 can have a window 622, which can define a range of temporal overlap the first, second, and third events can have and still be considered to cover a system level coverage point. For example, when the circuit design performs at least one of the second or third event outside of the window 622, the combination of the events may not be considered to cover a system level coverage point.

In some embodiments, the points 621 in the chart 620 also can be selectable, for example, in response to user input. The points 621, when selected, can prompt presentation of different graphic, such as a higher-level of abstraction, lower-level of abstraction, and/or one that presents different component combinations having common relative timings for at least one system level coverage point.

Figure 6D:
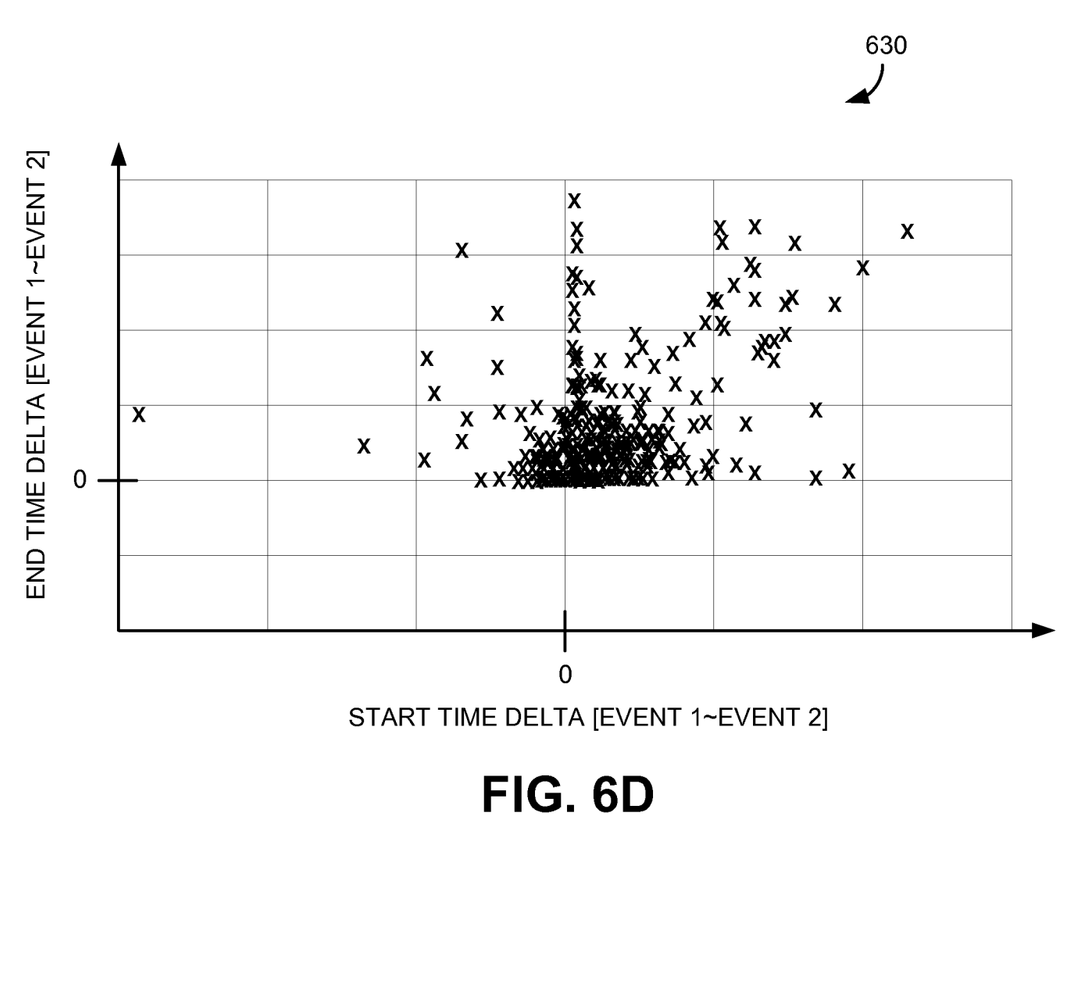

Referring to FIG. 6D, a chart 630 illustrate relative start and end timing for multiple events occurring during simulation of a circuit design. In some embodiments, the multiple events can include data transactions that prompt system level coverage points for a particular set of components in the circuit design and/or for a particular type of system level functionality.

The chart 630 includes an x-axis to show a transaction start time difference or delta between a first event and a second event. A positive start time delta can indicate that the first event started before the second event started. The chart 630 includes a y-axis to show a transaction end time difference or delta between the first event and the second event. A positive end time delta can indicate that the first event ended before the second event end. The chart 630 can plot multiple indicators or markers to identify start time deltas and end time deltas for different pairs of events. In some embodiments, the indicators or markers can be modified to indicate whether they correspond to a system level coverage point hit, to identify which component or combination of components correspond to the two events associated with the indicator or marker, or the like.

Figure 7:
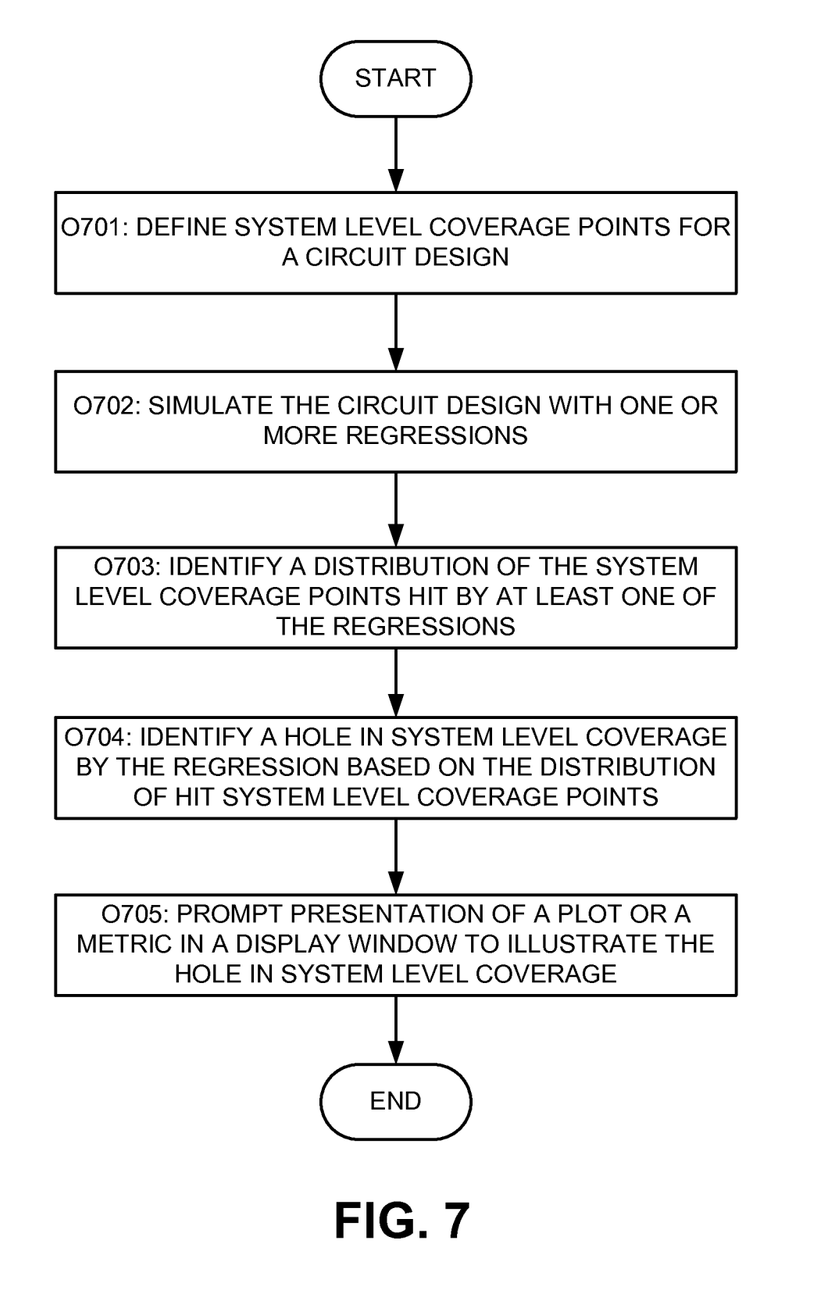
FIG. 7 illustrates a flowchart showing another example implementation of system level regression analysis according to various examples of the invention.

FIG. 7 illustrates a flowchart showing another example implementation of system level regression analysis according to various examples of the invention. Referring to FIG. 7, in a block 701, a design verification tool can define system level coverage points for a circuit design that are capable of being covered by one or more regressions during simulation of the circuit design. The system level coverage points can each be defined as a combination of multiple events in simulation data, such as specific transactions, component states, or the like, occurring within a specific window of time. In some embodiments, the definition of each system level coverage point also can include an identification of components in the circuit design corresponding to the multiple events and when the multiple events occurred within the window of time. Since each circuit design can have an individualized architecture, these definitions of system level coverage points can vary from circuit design-to-circuit design.

The design verification tool, in some embodiments, can generate at least one matrix of the system level coverage points capable of being hit or covered by a regression implemented during simulation of the circuit design. The matrix can be arranged to group similar system level coverage points near each other. For example, system level coverage points corresponding to a common system level functionality type, common component interaction, common transaction or state transition timing, or the like, can be located near each other in the matrix.

In a block 702, the design verification tool can simulate a circuit design with a test bench implementing one or more regression. During simulation, the test bench implementing the regressions, which can provide a set of test stimuli to the simulated circuit design, prompting the circuit design to perform operations, state changes, or the like, and output waveform data. The design verification tool can capture, during simulation of the circuit design, simulation data for components in the circuit design. In some embodiments, the simulation data can include operational states of the components in the circuit design, data transactions prompting transitions between the operational states for the components, or the like.

in a block 703, the design verification tool can identify a distribution of the system level coverage points hit by at least one of the regressions. The design verification tool can review or analyze simulation data generated corresponding to a regression to determine when a combination of transactions or states in the simulation data correspond to at least one of the defined system level coverage points. In some embodiments, the design verification tool can populate the matrix with indications of which of the possible system level coverage points where hit by the regression during simulation, and then utilize the matrix to identify a distribution of those system level coverage point hits. For example, the design verification tool can utilize a nearest neighbor analysis on the matrix to measure distances between points in the matrix corresponding to system level coverage point hits. The design verification tool can utilize these distances between system level coverage point hits to identify the distribution of those system level coverage point hits.

In a block 704, the design verification tool can identify a hole in system level coverage by the regression based on the distribution of hit system level coverage points. The design verification tool can analyze the matrix as populated with the system level coverage point hits to identify any holes in the matrix without or with few system level coverage point hits. In some embodiments, the design verification tool can utilize the distances between system level coverage point hits measured in the nearest neighbor analysis to identify the holes in the system level coverage. For example, the larger the distance between system level coverage point hits, the higher the probability that the matrix includes a hole that lacks system level coverage point hits.

In a block 705, the design verification tool can prompt presentation of a plot or a metric in a display window to illustrate the hole in the system level coverage. When the design verification tool identifies a hole or potential hole in the matrix, the design verification tool can generate a metric or plot to highlight the hole to a user. For example, when the hole corresponds to a lack of system level coverage point hits in a type of system level functionality, the design verification tool can generate a plot to illustrate the system level coverage points hit and un-hit in that type of system level functionality.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
    capturing, by a computing system, events performed during a simulation of a circuit design with a regression, wherein at least a portion of the circuit design is provided for subsequent design and manufacturing of electronic devices;
    identifying, by the computing system, that one or more combinations of the captured events correspond to one or more system level coverage points for system level functionality of the circuit design;
    populating, by the computing system, nodes of a matrix with indications that the identified combinations of the captured events covered the system level coverage points for the system level functionality of the circuit design, wherein each node in the matrix correspond to a different combination of the events capable of occurring during the simulation; and
    utilizing, by the computing system, the indications in the matrix to determine whether the system level functionality covered by the combinations of the captured events was previously uncovered for the circuit design.

2. The method of claim 1, further comprising generating, by the computing system, a regression efficiency metric configured to quantify newly covered system level functionality prompted by the regression based, at least in part, on the determination that the system level functionality covered by the combinations of the captured events was previously uncovered for the circuit design.

3. The method of claim 2, wherein the regression efficiency metric corresponds to a percentage of the combinations of the captured events that correspond to previously uncovered system level functionality of the circuit design.

4. The method of claim 1, further comprising building, by the computing system, the matrix with the nodes corresponding to the system level coverage points based on at least one of types of the system level functionality, components implementing the system level functionality, or relative timing of the events in the different combinations.

5. The method of claim 1, wherein the events include at least one of operational states for components in the circuit design, or transactions or data exchanged by the components in the circuit design.

6. An apparatus comprising at least one computer-readable memory device storing instructions configured to cause one or more processing devices to perform operations comprising:
    capturing events performed during a simulation of a circuit design with a regression, wherein at least a portion of the circuit design is provided for subsequent design and manufacturing of electronic devices;
    identifying that one or more combinations of the captured events correspond to one or more system level coverage points for system level functionality of the circuit design;
    populating nodes of a matrix with indications that the identified combinations of the captured events covered the system level coverage points for the system level functionality of the circuit design, wherein each node in the matrix correspond to a different combination of the events capable of occurring during the simulation; and
    utilizing the indications in the matrix to determine whether the system level functionality covered by the combinations of the captured events was previously uncovered for the circuit design.

7. The apparatus of claim 6, wherein the instructions are configured to cause one or more processing devices to perform operations further comprising generating a regression efficiency metric configured to quantify newly covered system level functionality prompted by the regression based, at least in part, on the determination that the system level functionality covered by the combinations of the captured events was previously uncovered for the circuit design.

8. The apparatus of claim 7, wherein the regression efficiency metric corresponds to a percentage of the combinations of the captured events that correspond to previously uncovered system level functionality of the circuit design.

9. The apparatus of claim 6, wherein the instructions are configured to cause one or more processing devices to perform operations further comprising building the matrix with the nodes corresponding to the system level coverage points based on at least one of types of the system level functionality, components implementing the system level functionality, or relative timing of the events in the different combinations.

10. The apparatus of claim 6, wherein the events include at least one of operational states for components in the circuit design, or transactions or data exchanged by the components in the circuit design.

11. A system comprising:
    a memory device configured to store machine-readable instructions; and
    a computing system including one or more processing devices, in response to executing the machine-readable instructions, configured to:
        capture events performed during a simulation of a circuit design with a regression, wherein at least a portion of the circuit design is provided for subsequent design and manufacturing of electronic devices;
        identify that one or more combinations of the captured events correspond to one or more system level coverage points for system level functionality of the circuit design;
        populate nodes of a matrix with indications that the identified combinations of the captured events covered the system level coverage points for the system level functionality of the circuit design, wherein each node in the matrix correspond to a different combination of the events capable of occurring during the simulation; and utilize the indications in the matrix to determine whether the system level functionality covered by the combinations of the captured events was previously uncovered for the circuit design.

12. The method of claim 11, wherein the one or more processing devices, in response to executing the machine-readable instructions, are configured to generate a regression efficiency metric configured to quantify newly covered system level functionality prompted by the regression based, at least in part, on the determination that the system level functionality covered by the combinations of the captured events was previously uncovered for the circuit design.

13. The method of claim 12, wherein the regression efficiency metric corresponds to a percentage of the combinations of the captured events that correspond to previously uncovered system level functionality of the circuit design.

14. The method of claim 11, wherein the one or more processing devices, in response to executing the machine-readable instructions, are configured to build the matrix with the nodes corresponding to the system level coverage points based on at least one of types of the system level functionality, components implementing the system level functionality, or relative timing of the events in the different combinations.

15. The method of claim 11, wherein the events include at least one of operational states for components in the circuit design, or transactions or data exchanged by the components in the circuit design.

* * * * *